United States Patent [19]

Farish et al.

[11] 4,024,465
[45] May 17, 1977

[54] GENERATION OF CORONA FOR LASER EXCITATION

[75] Inventors: Owen Farish, Glasgow, Scotland; Richard L. Hundstad, Wilkinsburg, Pa.

[73] Assignee: Westinghouse Electric Corporation, Pittsburgh, Pa.

[22] Filed: July 1, 1975

[21] Appl. No.: 592,291

Related U.S. Application Data

[63] Continuation of Ser. No. 365,392, May 30, 1973, abandoned.

[52] U.S. Cl. .......................................... 331/94.5 G
[51] Int. Cl.² .......................................... H01S 3/02
[58] Field of Search ............... 331/94.5; 330/4.3; 313/217

[56] References Cited

UNITED STATES PATENTS 3,657,600  4/1972  Wiegand, Jr. ............ 331/94.5 X

OTHER PUBLICATIONS

Alcock, described in "Spotlight on Montreal" in *Laser Focus*, July 1972, pp. 18 & 30 and in *Laser Focus*, Apr. 1972, pp. 22 & 23 & 34 & 35 to give May 10, 1975 disclosure date.
Targ et al., IEEE Journal of Quantum Electronics, vol. QE-8, No. 2, Feb. 1972, pp. 166–169.
Brandenberg et al., IEEE Journal of Quantum Electronics, vol. QE-8, No. 4, Apr. 1972, pp. 414–418.

*Primary Examiner*—William L. Sikes
*Attorney, Agent, or Firm*—M. P. Lynch

[57] ABSTRACT

A gas laser tube apparatus for producing a high-current glow, arc or spark which generates initiatory electrons and charged particles for establishing excitation of gas molecules in a separate region of the tube. Separate regions of ionization and excitation are established so that uniformity of excitation, optimization of the ratio of electric field intensity to electron density (E/N) and uniform intensity of excitation can be obtained in a high pressure gas laser system independent of ionization or initiation of discharge which also may need to be optimized. The separate fields are achieved by proper configuring of the electrodes with appropriate voltages applied thereto.

2 Claims, 5 Drawing Figures

GENERATION OF CORONA FOR LASER EXCITATION

This is a continuation of application Ser. No. 365,392, filed May 30, 1973, now abandoned.

BACKGROUND OF THE INVENTION

1. Field of the Invention

This invention relates to gas laser tubes and more particularly to those laser systems operating in a pulse mode at high pressure.

2. Description of the Prior Art

One of the sources for high average power laser output is the high pressure transversely excited laser. A typical arrangement for such a laser provides for two long electrodes (one often including a number of pin cathodes and the other being a continuous anode) a few centimeters wide and spaced a few centimeters apart. The optical axis of the laser is parallel to the electrode surfaces and transverse to the electric field established between the electrodes. The lasing gas is circulated through the electrode gap in a direction transverse both to the optical axis and the electric field at typical velocities in the range of 15 m/sec to 120 m/sec.

In such lasers, population inversion is obtained by a pulsed glow discharge generated by applying a pulsed voltage across the electrode gap. Complete breakdown of the gap when the pulse is applied must be avoided to have proper laser operation. By tailoring the duration and shape of the pulses to avoid overheating of the gas the chance of complete breakdown can be reduced although the most efficient lasing conditions may not be achieved since the value of E/N cannot then be independently optimized.

One reason for breakdown in prior laser configurations has been lack of control over the ratio of electric field strength to the density of gas molecules (E/N) in the region where exciting collisions occur. The field, to obtain efficient ionization of the gas, must be high while optimum excitation conditions require a reduced value of E/N. If ionization and excitation occur in the same or overlapping regions, optimum conditions for both ionization and excitation cannot be acheived.

One method of separating the ionization and excitation regions in a low pressure CW laser is by utilizing a coaxial electrode configuration. Such a configuration is operative for low voltage D.C., static gas, and low pressure conditions. Under high voltage and high pressure conditions, however, overheating of the gas would occur and breakdown of the gap would result since no allowance is made for gas flow.

SUMMARY OF THE INVENTION

According to the present invention, a high pressure gas laser tube is provided having at least two electrodes so configured to provide separate regions for ionization of the gas and for excitation of the gas molecules to a lasing state. A typical configuration allows for a glow, spark or arc discharge behind a screen or mesh electrode through which the electrons generated in the discharge are injected into an excitation region in a direction toward an anode electrode set opposite the screen electrode. By providing gas flow through the discharge and excitation regions and by applying high voltage pulses to the electrode assembly to produce large numbers of electrons by ionization in the highly stressed pin-screen gap while maintaining a D.C. or pulsed bias across the excitation region between the mesh and plane electrodes, the gas molecules in the excitation region can be raised to a lasing level by collision with the initiatory electrons. Since the E/N ratio can be optimized in the excitation region, the resulting operation is more efficient and stable than previous configurations for high pressure use having reduced the likelihood of total breakdown in the gas.

DESCRIPTION OF THE PREFERRED EMBODIMENTS

Figure 1:
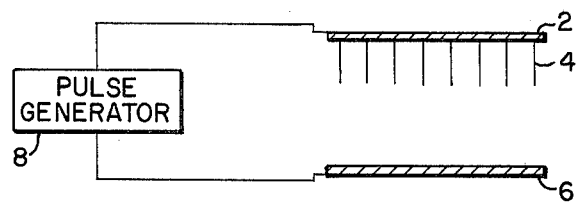
FIG. 1 is a schematic diagram of a prior art pulsed gap electrode configuration for a high pressure gas laser system.

In FIG. 1 a prior art electrode configuration which can be used in a laser tube is shown wherein a pulse voltage applied to the electrodes 2 and 6 controls the high current glow between the electrodes. A cathode 2 having a plurality of pins 4 is shown adjacent a planar anode 6 which together comprise a pin-to-plane electrode assembly. When a pulse from pulse generator 8 is applied across the gap defined by the pins 4 and anode 6, a nonuniform field is established. Provided that the pulse is controlled to the proper shape and duration, a high current glow discharge can be established in a high pressure environment, without overheating the gas and without subsequent breakdown. Under the proper pulsing conditions a "shower" discharge can be obtained between the cathode pins 4 and the anode 6 having peak currents of several amperes.

The electrode configuration of FIG. 1, however, does not allow for control of the E/N ratio at an optimum value in that region of the gap where exciting collisions occur. An improvement to the configuration of FIG. 1 is to provide control of the excitation region by separate electric fields, one high voltage field giving rise to a high current glow, spark or arc discharge in the ionization region to produce free electrons and a second uniform electric field to produce an optimum E/N ratio for excitation of the gas molecules to the required vibrational energy levels for laser action.

The electrical discharge in the ionization region can take the form of a glow, spark, or arc discharge provided the discharge is separate from the excitation region so as not to interfere with lasing action. For each type of discharge, electrons are generated by the discharge for utilization in the excitation region although for each the physical phenomenon which occurs is different. Under glow discharge conditions there is high potential across the gap with relatively little heating of the gas while the energy supplied to the ionization region is below some maximum amount. A uniform discharge occurs across the entire region. One discharge occurs when the energy supplied to the ionization region exceeds some given amount causing nonuniformity of discharge between electrodes. The arc or arcs that are formed carrying heavy currents between the electrodes, and the potential drops to near zero. In the spark type of discharge, a spatial discontinuity develops in the discharge and a sputtering or intermittent discharge occurs.

Figure 2:
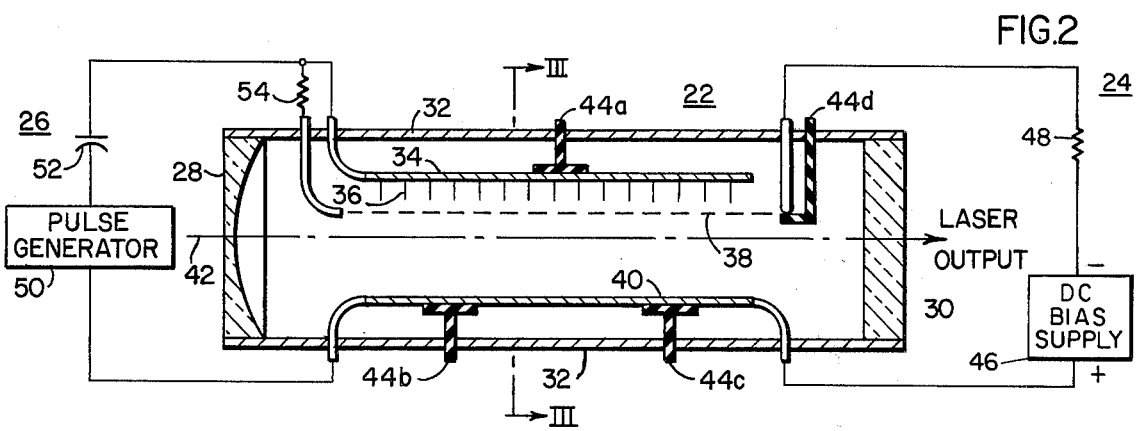
FIG. 2 is a schematic circuit diagram of a preferred embodiment of the present invention.
Figure 3:
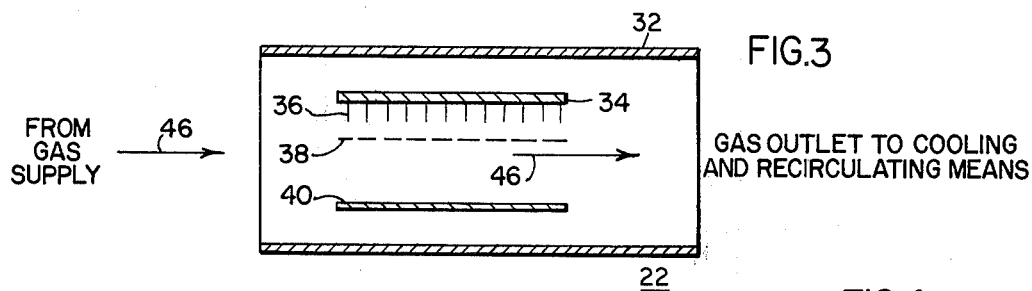
FIG. 3 is a cutaway sectional view of the embodiment of FIG. 2.

In FIG. 2 a gas tube 22 is shown which is operative at high pressure with a continuous gas flow through the electrode gap (FIG. 3). Different electrode geometries including planar, pin or shaped surface types can be used to obtain separate ionization and excitation regions but allowance must be made in each case for gas flow.

In FIG. 2 the gas tube 22 is connected to a D.C. bias supply circuit 24 and a pulse generator circuit 26. The gas tube 22 has an essentially totally reflecting optical element 28 and a partially transmitting optical element 30 positioned opposite one another and orthogonal to the optical axis 42 of the laser. Side walls 32 are sealed hermetically to the optical elements 28 and 30 to provide an integral enclosure for the gas medium of the laser. It will be understood that these elements of the tube 22 can be modified without effecting the claimed invention, tube 22 being merely typical in the art.

Once the gas tube 22 has been evacuated it is filled with a suitable gaseous lasing medium as for example CO, $CO_2$, a metallic vapor, or some other atomic or molecular gas which can supply an active particle for lasing.

Within tube 22, a first electrode cathode 34 having a plurality of pins 36, a second electrode, grid 38 of a screen or mesh construction which is pervious to electrons and photons, and a third electrode anode 40, are positioned parallel one to another and to the optical axis 42 of the gas tube 22. Support for the electrodes, to rigidly maintain each fixed relative to the sidewalls 32 and to one another, is provided by support means 44a, 44b, 44c, and 44d.

Gas flow is in a direction orthogonal to both the optical axis 42 and the electrical discharge between electrodes. It is best shown in FIG. 3 by arrows 46. Actual gas supply means, cooling means and recirculating means for the gas are not shown in that they are well known in the art.

It will also be noted from FIGS. 2 and 3 that the multiple pins 36 are arranged in a series of rows which are aligned with the optical axis of the laser system. A single row of pins would also be sufficient for the arc or glow discharge function in a given laser system.

Referring again to FIG. 2, the D.C. bias supply circuit 24 is shown connected across the grid 38 and the anode 40 of the gas tube 22. The circuit 24 includes a D.C. bias supply 46 connected from its negative terminal through resistance 48 to the grid 38. The positive side of the D.C. bias supply 46 is connected to the anode 40. The D.C. bias supply 46 established a uniform electric field across the gap between the grid 38 and the anode 40 resulting in a region of uniform electric field which can be controlled to obtain an optimized E/N ratio which may be somewhat lower than that necessary to initiate sparks or arcs, for a given flow and gas pressure. With a low E/N ratio in the gap between grid 38 and anode 40 the required exciting collisions between electrons and molecules take place giving rise to laser action. The uniform electric field E can have a higher average value before breakdown is experienced than for a non-uniform field across a comparable gap thereby exchanging the conditions for excitation of the gas molecules without breakdown.

Reversal of the relative polarity of the uniform field electrodes 38 and 40 is a possible alternative arrangement to that shown in FIG. 2. In such an arrangement ultraviolet irradiation of the electrode 40, which effectively would act as a cathode relative to electrode 38, causes photoelectron production. Excitation of the gas molecules is then triggered by the photoelectrons.

The pulse circuit 26 includes a pulse generator 50 connected across cathode 34 and anode 40. A capacitor 52 is connected between pulse generator 50 and cathode 34. The D.C. bias voltage from the D.C. bias circuit 24, applied to grid 38, is coupled to the multipin cathode 34 through a high impedance element 54. Initially, before a pulse is generated by generator 50, the discharge gap between the multi-pin cathode 34 and the grid 38 is a field free region.

An arc, spark or glow discharge is then initiated in the gap between the multi-pin cathode 34 and the grid 38 by applying a pulse voltage from pulse generator 50 to cathode 34. The discharge causes ionization of the gas and free electrons are generated which drift through the mesh-or-screenlike structure of grid 38 into the excitation region of the uniform field gap between grid 38 and anode 40. The gas tube 22 of FIGS. 2 and 3 can thereby be operated to give high current glow or arc discharge or even a spark discharge while maintaining a separate uniform field region in which E/N is more easily adjusted to some optimum value for lasing operation.

The D.C. bias circuit 24 can be replaced with a pulse bias circuit operated in synchronism with pulse circuit 26. In such an arrangement the uniform field between grid 38 and anode 40 could be pulsed on to coincide with the injection of electrons from the discharge gap between cathode 34 and grid 38. The effect would be similar to that obtained with a constant D.C. bias.

Figure 4:
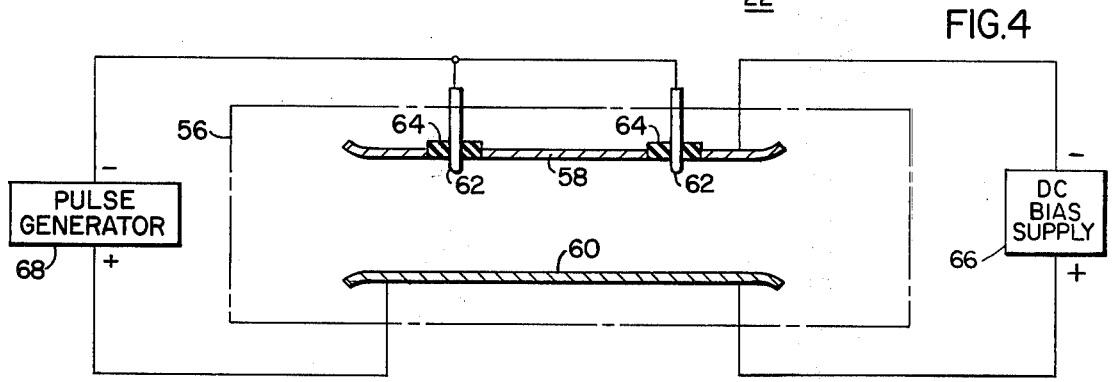
FIG. 4 is another embodiment having uniform field gap with corona pins.

Referring to FIG. 4 another electrode configuration is shown in which a separation of ionization and excitation functions is achieved. It will be appreciated that the electrode structure illustrated is positioned within a laser gas tube such as was shown in FIG. 2 but which is here indicated by dotted line 56. Gas flow in the tube, although not shown in FIG. 4, would normally be in a direction parallel to the planar uniform field electrodes 58 and 60.

In FIG. 4 the pin electrodes 62 are essentially in the same plane as the uniform field electrode 58 but insulated therefrom by insulating means 64. Only two corona pins are shown for ease of representation but more can typically be used. The electrode 58 has a planar surface and acts as a cathode relative to electrode 60. A uniform field is established between electrodes 58 and 60 by application of a D.C. bias voltage from D.C. voltage source 66. By applying a high voltage pulse to the corona pins from the pulse generator 68 a corona discharge can be initiated at the corona pins 62 next adjacent the electrode 68 which ionizes the gas molecules in that immediate vicinity. Electrons are generated which are accelerated by the uniform field to collide with gas molecules initiating the avalanche effect required to raise the gas to the necessary vibrational energy levels for lasing.

The electrode configuration of FIG. 4, although possibly introducing some disturbance of the uniform field in the immediate region of the electrode 58 due to the corona discharge, does allow for independent control of E/N for a given flow and pressure in the region of excitation by means of the D.C. bias supply 66. In some cases it might also allow for easier construction of the electrode assembly in that the pins 62 would be firmly affixed through electrode 58.

Figure 5:
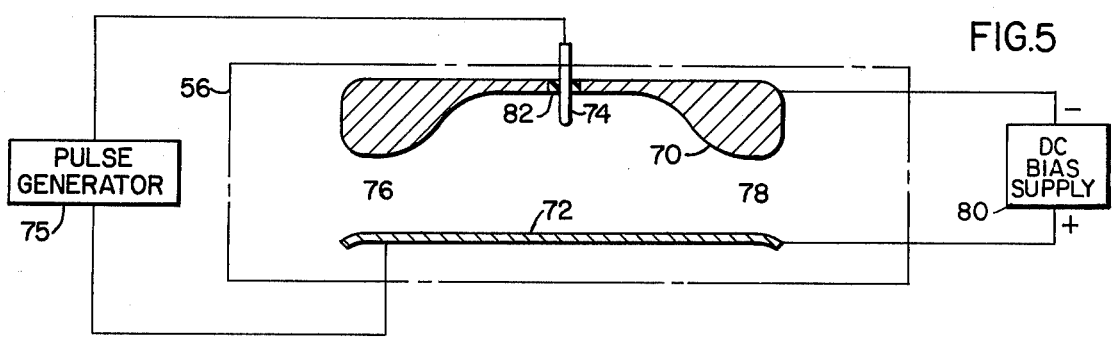
FIG. 5 is another embodiment having quasi-uniform field gap with corona pins.

In FIG. 5 a slight modification to the scheme of FIG. 4 is shown. Rather than a uniform field being established across the entire gap between electrodes 70 and 72, what can rather be termed a quasi-uniform field is established. Electrode 70 is shaped so that the field near the corona pin 74, when pin 74 is subjected to a high voltage pulse from pulse generator 75, becomes an ionization region creating free electrons which drift into adjacent regions of essentially uniform fields 76 and 78 which consequently are also regions of constant E/N. The electrode 70 has a shaped surface facing electrode 72. The portions of that surface in the regions of uniform fields 76 and 78 are closer to the electrode 72 than the portion of the surface surrounding the corona pin 74. Again the E/N ratio is independently controlled for a given flow and pressure by bias supply 80. The corona pin 74 can be insulated from electrode 70 by some suitable means 82, but it will be readily obvious that insulation is not essential to operation of this electrode assembly. The electrode assembly would also normally be positioned in some tube similar to that shown in FIG. 2 and indicated in FIG. 5 by dotted line 56 with allowance for gas flow between electrodes 70 and 72.

By separating the regions for ionization and excitation of the gas medium and by providing, independent control of the excitation region to obtain a constant, optimum value of E/N for given pressure and flow conditions, laser excitation in a high pressure gas laser is much improved.

What we claim is:

1. A high-pressure gas laser apparatus for use in producing a laser output comprising:
    a resonant optical cavity including optical reflective elements passively terminating each end of said cavity,
    a gas medium at high pressure suitable for lasing action,
    an envelope volume substantially enclosing the resonant optical cavity,
    an electrode assembly positioned within said envelope having a first field gap region and a second field gap region, wherein said electrode assembly includes first, second and third electrodes,
    said second electrode being at least one corona pin protruding through and insulated from said first electrode,
    said first electrode having a substantially planar surface consisting of a surface area immediately adjacent to said second electrode and a remaining surface area,
    said third electrode having a substantially planar surface and parallel to said substantially planar surface or the first electrode,
    said first field gap region being determined between the second electrode and the surface area of said first electrode immediately adjacent to said second electrode,
    said second field gap region being determined between said third electrode and the remaining surface area of said first electrode,
    pulsing means coupled to said first gap region for establishing an electrical discharge in said first region for generating free electrons, and
    D.C. bias means, separate and independent from said pulsing means, coupled to said second field gap region for establishing a predetermined uniform electric field for accelerating said free electrons from said first field gap region to said second field gap region for excitation of said gas medium to lasing vibrational energy levels by electron collision.

2. A high pressure gas laser apparatus for use in producing a laser output comprising:
    a resonant optical cavity including optical reflective elements passively terminating each end of said cavity,
    a gas medium at high pressure suitable for lasing action,
    an envelope volume substantially enclosing the resonant cavity,
    an electrode assembly positioned within said envelope and having a first field gap region and a second field gap region, said second field gap region being separate and apart from said first field gap region,
    pulsing means coupled to said first field gap for establishing an electrical discharge in said first region for generating free electrons,
    D.C. bias means, separate and independent from said pulsing means, coupled to said second field gap region for establishing a predetermined uniform electric field in said second region and causing said free electrons to drift from said first region into said second region for excitation of said gas to lasing vibrational energy levels by electron collision and providing a glow discharge,
    said electrode assembly including first, second or third electrodes,
    said second electrode being at least one corona pin protruding through and affixed to said first electrode,
    said first electrode having a first surface area facing and spaced at a first distance from said third electrode,
    said first surface area being in close proximity to said second electrode,
    said first electrode having a second surface area substantially planar, facing and spaced at a second distance from said third electrode,
    said third electrode having a substantially planar surface and parallel to the said second surface area of the first electrode,
    said first field gap region being determined between the second electrode and said first surface area of said first electrode,
    said second field gap region being determined between said third electrode and said second surface area of said first electrode.

* * * * *